United States Patent

Han et al.

[11] Patent Number: 5,989,311
[45] Date of Patent: Nov. 23, 1999

[54] RECOVERY OF COPPER FROM ITS SULFIDES AND OTHER SOURCES USING HALOGEN REAGENTS AND OXIDANTS

[75] Inventors: Kenneth N. Han; Xinghui Meng, both of Rapid City, S. Dak.

[73] Assignee: South Dakota School of Mines and Technology, Radid City, S. Dak.

[21] Appl. No.: 08/901,451

[22] Filed: Jul. 28, 1997

[51] Int. Cl.[6] .......................... C21B 15/00; C01G 55/00; B01D 511/00; H01M 6/50

[52] U.S. Cl. .......................... 75/743; 423/38; 423/150.1; 429/49

[58] Field of Search ............... 75/710, 714, 715, 75/743; 423/27, 150.4, 150.1, 38, 23; 429/49

[56] References Cited

U.S. PATENT DOCUMENTS

| | | |
|---|---|---|
| 3,884,831 | 5/1975 | Bloom ........................................ 423/27 |
| 4,039,406 | 8/1977 | Stanley et al. . |
| 4,084,961 | 4/1978 | Caldon . |
| 4,132,758 | 1/1979 | Frankiewicz et al. . |
| 4,144,310 | 3/1979 | Frankiewicz et al. . |
| 4,312,841 | 1/1982 | Tolley et al. ........................ 423/150.4 |
| 4,971,662 | 11/1990 | Sawyer et al. ............................ 423/38 |
| 5,096,486 | 3/1992 | Anderson et al. . |
| 5,114,687 | 5/1992 | Han et al. . |
| 5,217,171 | 6/1993 | Feldman ..................................... 241/24 |
| 5,308,381 | 5/1994 | Han et al. . |
| 5,328,669 | 7/1994 | Han et al. . |
| 5,542,957 | 8/1996 | Han et al. . |
| 5,607,619 | 3/1997 | Dadgar et al. ............................. 423/23 |

OTHER PUBLICATIONS

Vizsolyi et al., "Copper and Elemental Sulphur from Chalcopyrite by Pressure Leaching," *Journal of Metals*, pp. 52–59 (Nov. 1967).

J.E. Dutrizac, "The Leaching of Sulphide Minerals in Chloride Media," *Hydrometallurgy*, vol. 29 (1992), pp. 1–45, (No Month).

*Primary Examiner*—Prince Willis
*Assistant Examiner*—Tima McGuthry-Banks
*Attorney, Agent, or Firm*—Nixon & Vanderhye, P.C.

[57] ABSTRACT

Copper and nickel are extracted from their elemental state, complex sulfides, ores, and other materials such as scrap by leaching them with a solution containing halogen salts: bromine/bromide, or iodide/iodine, oxygen and sodium or potassium nitrate. The invented process is particularly effective for chalcopyrite and pentlandite in an autoclave at a temperature of 100° C.–150° C.

15 Claims, 2 Drawing Sheets

Flowsheet for Chalopyrite Concentrate Processing.

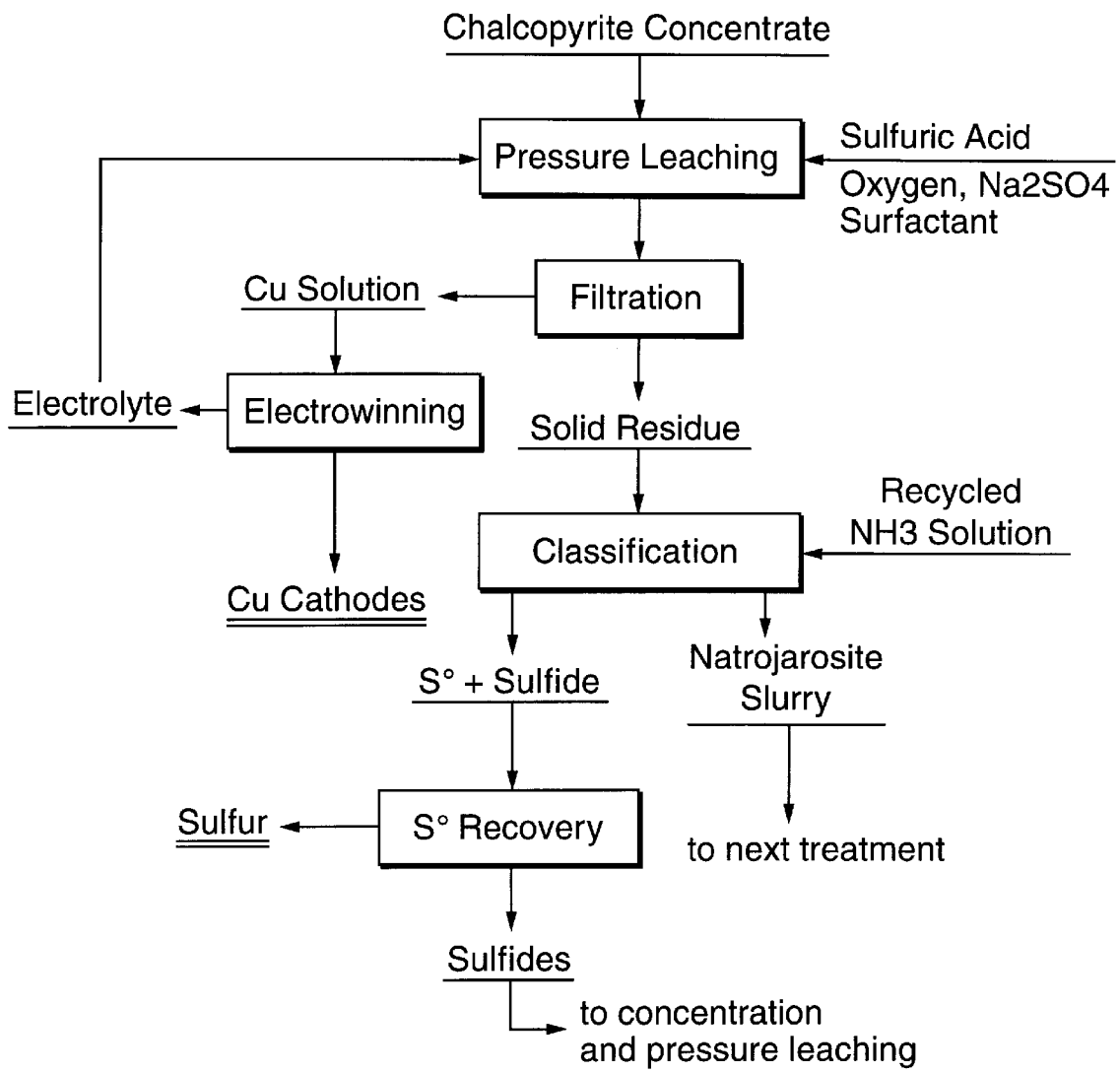
Fig. 1 Flowsheet for Chalopyrite Concentrate Processing.

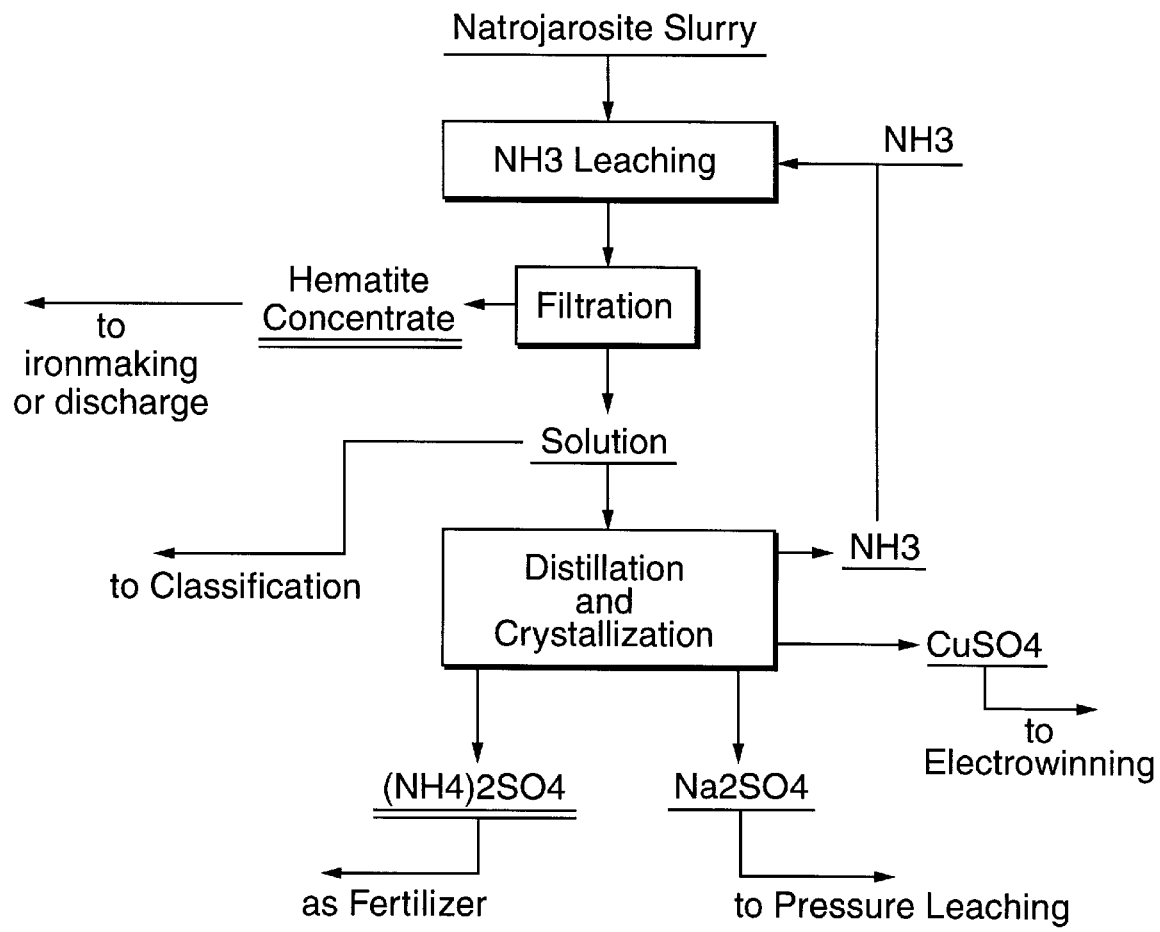
Fig. 2 Flowsheet for Natrojarosite Treatment.

RECOVERY OF COPPER FROM ITS SULFIDES AND OTHER SOURCES USING HALOGEN REAGENTS AND OXIDANTS

TECHNICAL FIELD

Copper and nickel are extracted from their elemental state, complex sulfides, ores, and other materials such as scrap by leaching them with a solution containing halogen salts: bromine/bromide, or iodide/iodine, oxygen and sodium or potassium nitrate. The invented process is particularly effective for chalcopyrite and pentlandite in an autoclave at a temperature of 100° C.–150° C.

BACKGROUND ART

Copper is the third most widely used metal in the world following iron and aluminum. In 1995, nearly 2 million metric tons of copper were produced from over 40 mines operating in the U.S., which was worth over $5.7 billion. This represents about 20% of the world production of this metal in 1995. The U.S. is the second largest producer of copper, closely followed by Chile. In addition, 0.37 million metric tons of copper were produced from scrap in the U.S. in the same year. Copper is an important element which is used in building construction, 42%; electric and electronic products, 22%; industrial machinery and equipment, 13%; transportation equipment, 13%; and, consumer and general products, 10%.

The production of copper currently heavily relies upon a high temperature technology where copper concentrates, primarily copper sulfides, are subject to roasting and smelting followed by electrowinning and/or solvent extraction to produce elemental copper. This high temperature smelting process has an environmental drawback in which the process stack gas contains sulfur containing components which have to be removed before the gas is allowed to escape to the environment. Furthermore, the process is inherently expensive due to its high energy use and requires expensive maintenance of the smelting operation. In spite of such drawbacks in smelting operation, it is believed that about 70–80% of copper produced in the U.S. is currently carried out by this smelting technology. Only 20 to 30% of copper is recovered hydrometallurgically from the low grade ores by heap leaching where sulfuric acid and air are used.

The applicability of the heap leaching technology to sulfide concentrates which represent the majority of copper produced in this country is doubtful. There is an urgent need to develop a process which is able to treat copper concentrates in both environmentally and economically acceptable ways.

It should be noted, however, that numerous hydrometallurgical methods have been suggested and attempted, some of which have been fairly successful even at the pilot plant level. Vizsolyi et al. ("Copper and Elemental Sulphur from Chalcopyrite by Pressure Leaching," *Journal of Metals*, pp. 52–59, November 1967) have shown that 98% recovery of copper from chalcopyrite ($CuFeS_2$), one of the major copper containing minerals, was possible by a pressure leaching. Such a recovery of copper can be obtained at about 120° C. and 500 psi pressure after a 2.5 hour leaching with 325 mesh size mineral particles. Although the recovery was good, the pressure was too excessive and furthermore, the treatment of the iron produced in such a system is usually proven to be too costly.

U.S. Pat. No. 5,096,486, to Anderson et al., and U.S. Pat. No. 4,084,961, to Caldon et al., have shown that copper sulfides can be treated to recover copper using sulfuric acid and sodium nitrite or nitric acid at 70° to 160° C. after 0.5 to 4 hours of leaching. When nitric acid was used the temperature could be below 100° C. The copper recovery was about 90–95%.

U.S. Pat. Nos. 4,132,758 and 4,144,310 to Frankiewicz et al. have shown that copper sulfides could be treated using nitrogen dioxide ($NO_2$) at 100° C. for about 6 hours of leaching. The copper recovery was about 90%. These technologies in general induce a very corrosive environment and hence the maintenance of the leaching reactor causes an industrial nightmare. The treatment of dissolved iron in the liquid is also costly.

Many researchers have used halogen salts such as chlorine/chloride and bromide (U.S. Pat. No. 4,039,406 to Stanley et al., and J. E. Dutrizac, "The Leaching of Sulphide Minerals in Chloride," *Hydrometallurgy*, vol. 29 (1992), pp. 1–45) to recover copper from various copper-bearing minerals. The process taught by Stanley et al. utilizes chloride or bromide to convert copper sulfides to insoluble copper sulfate. These technologies are in general very slow in the rate of copper recovery and there are many problems associated with the removal or iron and effective recovery of copper from the leach liquor. As a result, none of these processes are being used in the copper producing industry.

Researchers at the South Dakota School of Mines and Technology (SDSM&T) have recently developed noble and environmentally friendly technologies of extracting precious metals, including platinum group metals, silver and gold, from ores and automobile catalytic converters using ammonia and/or halogen salts (U.S. Pat. Nos. 5,114,687, 5,308,381, 5,328,669 and 5,542,957 all herein incorporated by reference). These processes teach how well precious and other metals could be recovered from ores and other materials, and also demonstrate how such metals could be recovered using environmentally benign technologies.

Although environmentally friendly technologies for extracting precious metals has been developed, a need still exists to provide more environmentally friendly methods to recover copper, particularly copper in the form of copper sulfides.

The present invention solves this need by providing an improved process for the extraction of copper from various source materials which is both economical and environmentally friendly.

SUMMARY OF THE INVENTION

Accordingly, it is a first object of the present invention to provide an improved process for the extraction and/or recovery of copper from its sulfides and other sources.

Another object of the present invention is a process which extracts copper from a copper-bearing material while producing an easily filterable and environmentally acceptable iron-containing by-product.

A still further object of the present invention is an improved process which continuously regenerates and recycles reactants of the process for economical and environmental gain.

A still further object of the present invention is a process which requires no additional energy by reason of its exothermic nature and one that produces high levels of copper recovery.

Other objects and advantages of the present invention will become apparent as a description thereof proceeds.

In satisfaction of the foregoing objects and advantages, the present invention is an improvement over prior art techniques which utilize halogen salts and/or ammonia/ammonium in the presence of oxygen. According to the invention, copper or nickel-bearing material is combined with reactants including water, bromine/bromide, iodine/iodide, sodium or potassium nitrate, and optionally oxygen and sulfuric acid to form a charged reaction zone. The charged reaction zone is mixed to leach the copper or the nickel from the materials containing these metals. The mixing produces a slurry containing the leached copper or nickel. The dissolved metals are then separated from the slurry and recovered using conventional techniques such as electrowinning, cementation, solvent extraction and chemical precipitation.

The copper or nickel-bearing materials can be first ground to facilitate the leaching step.

In a preferred embodiment, the reaction zone is maintained at a temperature of about 25° C. or up to 150° C. Pressures can range from atmospheric to up to 270 psig (1863 kPa).

When using sodium or potassium nitrate, the concentration thereof ranges between 0.0 to 1.0 gram-mol/cm$^2$. When bromide is used as a reactant, the bromide can be in the form of sodium or potassium bromide in a concentration level of 0.01–0.2 gram-mol/dm$^2$. Similar concentrations can be used when the halogen is iodine/iodide.

The pH of the leached solution can range between 0.5 and 5.0 with the optimum pH being between 1 and 2.

In another aspect of the invention, an iron-containing slurry is obtained once the copper or nickel is obtained. The remaining solid residue is combined with a recycled ammonia solution and classified to form a natrojarosite slurry. This slurry can easily be converted to hematite by washing with ammonia. By-products of the natrojarosite slurry treating steps can then be used for the leaching of the copper or nickel-bearing materials.

Unique to the invention is that halogen ions such as bromide or iodide and nitrogen oxide generated from the extraction process are continuously converted respectively to bromine or iodine and to nitrate. The bromine/iodine and nitrate are major reagents for the production of copper ions in the leach solution.

In another aspect of the invention, copper can be recovered from electronic scrap using bromine/bromide or iodine/iodide.

BRIEF DESCRIPTION OF THE DRAWINGS

Reference is now made to the drawings of the invention wherein:

FIG. 1 is a flowsheet for chalopyrite concentrate processing using the inventive method; and FIG. 2 is a flowsheet showing the recovery of natrojarosite produced in the process shown in FIG. 1.

DESCRIPTION OF THE PREFERRED EMBODIMENTS

The instant invention offers a significant advantage over prior art techniques to recover various metals from native oxides, scrap, complex ores, sulfides and the like. The invention is both economical and environmentally safe, particularly since reactants used to extract the desired metals are continuously regenerated and recycled by the inventive process.

In one mode, the invention utilizes a mixture of bromine and/or iodine and a nitrate as key solvents to dissolve copper from its solid forms, such as its native state, sulfides, complex ores and scrap, particularly electronic scrap.

According to the invention, copper and/or nickel is extracted from a copper and/or nickel bearing material either in their respective elemental states or as sulfides, complex ores and scrap. The invention uses bromine/bromide or iodine/iodide as a main reactant to dissolve copper from its elemental state or sulfides. The halogen, bromine or iodine, reacts with sulfur to leach copper from the copper-bearing material as copper in solution. The dissolved copper can then be recovered using conventional techniques as described below. Other reactants can be used depending on the type of material to be recovered. In the case of electronic scrap, bromine/bromide can be used as exemplified below. Alternatively, copper in the form of chalcopyrite can be recovered using sulfuric acid and a nitride such as sodium or potassium nitrate, a halogen containing reactant such as sodium bromide or sodium iodide, sulfuric acid, oxygen and sodium sulfate. Nickel can also be recovered when using sulfuric acid, oxygen, sodium nitrate or potassium nitrate and sodium bromide or sodium iodide. The oxygen and sulfuric acid as reagents may be optional since bromide/iodide is a strong oxidant and the reaction produces sulfuric acid as shown below.

It should be noted that the inventive process is unique in its use of the nitrate for metal recovery. Previous technologies have used nitrite and halogen elements or salts in order to effectively recover copper as well as to complex iron produced in the leached solution. With the invention, reactants are continuously being regenerated and recycled to make the process both economical and environmentally safe.

It should be understood that either bromine or iodine can be used to recover the desired metal. In addition, reactants such as sodium sulfate and sulfuric acid are optional during steady state operations since these reactants are continuously produced as part of the overall reaction equations and, therefore, is not necessary.

The inventive process can also use a surfactant, e.g. dithiocarbonate or the like to facilitate coagulation of the elemental sulfur produced during the reaction equations.

The following provides a more detailed explanation of the chemistry involved in the inventive process.

It is well known that bromine, $Br_2$ and iodine, $I_2$ are very strong oxidants used in various applications.

$$Br_2 + 2e \rightarrow 2Br^- \quad E°=1.087V \qquad (1)$$

$$I_2 + 2e \rightarrow 2I^- \quad E°=0.621V \qquad (2)$$

In order to dissolve copper from its elemental state or sulfides, a cathodic reaction such as Eqs. 1 and 2 needed. When complex sulfides such as chalcopyrite ($CuFeS_2$) react with bromine, the reaction equation will be complicated as indicated in Equation 3 as an example reaction:

$$CuFeS_2 + 5/2Br_2 + 3/2H_2SO_4 + 1/6Na_2SO_4 + 2H_2O = 2S° + 5Br^- + CuSO_4 + 1/3NaFe_3(SO_4)_2(OH)_6 + 5H^+ \qquad (3)$$

The bromide ($Br^-$) produced will react with nitrate to produce bromine again to be used in Eq. 3. This process is shown in Eq. 4:

$$Br^- + 5/3NO_3^- + 20/3H^+ = 5/2Br_2 + 5/3NO + 10/3H_2O \qquad (4)$$

It should also be noted that the elemental sulfur produced in Eq. 3 will react with nitrate to produce sulfuric acid which is also an important reactant used in Eq. 3:

$$S°+2NO_3+2H^+=H_2SO_4+2NO \tag{5}$$

Nitrogen oxide produced in Eqs. 4 and 5 will react with oxygen in the system to produce nitrate which is a necessary component in Eq. 4:

$$5/3NO+5/4\ O_2+5/6H_2O=5/3H^++5/3NO_3 \tag{6}$$

Part of the elemental sulfur produced in earlier reaction will also react with bromine to produce sulfuric acid and bromide.

$$S°=3Br_2+4H_2O \tag{7}$$

The overall reaction of the proposed process can be represented by Eq. 8:

$$CuFeS_2+5/4O_2+3/2H_2SO_4+1/6Na_2SO_4=2S°+CuSO_4+1/3NaFe_3(SO_4)_2(OH)_6+1/2H_2O \tag{8}$$

It should be noted that the nitrate and either the bromide or iodide are necessary chemicals in this process and can act as an oxidant as well as a catalyst. This is not shown in the overall chemical reaction in Eq. 8 and is totally recycled.

One of the significant advantages of this technology is the fact that the reaction is strong exothermic and hence no additional energy is required to maintain the reaction temperature at about 100–150° C. Other advantages of this process include the ability of regeneration of reactants and that the iron is precipitated as sodium-jarosite, often referred to as natro-jarosite ($NaFe_3(SO_4)_2(OH)_6$). The reaction is fast as well, e.g., does not take more than 20 minutes to produce 96–99% copper in the leach liquor.

In one embodiment of the invention, metal to be recovered, e.g., copper or nickel, is leached or extracted by charging a reaction zone with the material containing to be recovered and the reactants necessary for recovery of the metal depending on its make up. In one mode, a halogen such as bromide/bromine or iodide/iodine is used. In this mode, a nitrate can be added if iron is to be precipitated. Otherwise, the nitrate is not needed to recover the desired metal.

Preferably, an autoclave is used to receive the charged materials as the charged reaction zone. Once the reactants and material are charged, they are mixed for leaching of the metal to be recovered. The recovered metal is in solution and is further recovered by conventional techniques such as electrowinning, cementation, solvent extraction, chemical precipitation or equivalence thereof.

The reactants for the leaching step include bromide/bromine or iodide/iodine, a nitrate such as sodium or potassium nitrate, and optionally oxygen and sulfuric acid and sodium sulfate.

EXAMPLES

The following specific examples are illustrative of, but are not limitations of, the current invention. It should be understood that similar results could be obtainable with other combinations of conditions other than those specifically considered in the following examples.

Example No. 1

Numerous copper concentrates provided by the U.S. and foreign companies have been tested. In this series of examples, typical three samples of chalcopyrite flotation concentrates have been chosen to demonstrate the capability of this new technology. The chemical compositions of the concentrations of copper, iron and sulfur of these samples are listed in Table 1.

TABLE 1

| The Chemical Compositions of Chalcopyrite Concentrates | | | |
|---|---|---|---|
| Sample | Cu % | Fe % | S % |
| No. 1 | 30.84 | 31.6 | 33.0 |
| No. 2 | 30.4 | 29.4 | 32.8 |
| No. 3 | 27.7 | 28.0 | 31.5 |

The extraction of copper was carried out for these three samples at 100–150° C., 20 min. of leaching time, total pressure 1380 kPa. (oxygen partial pressure less than 900 kPa), initial sulfuric acid ($H_2SO_4$) concentration of 1.61 mole/cm³, solid concentration 12.5%, sodium nitrate ($NaNO_3$) 0.44 mole/cm³, sodium bromide (NaBr) 0.12 mole/cm³, and sodium sulfate $Na_2SO_4$ 0.35 mole/cm³ in a 400 ml solution. In addition, a little amount of surfactant was added to facilitate coagulation of elemental sulfur. The recovery of copper into the solution from these concentrates was found to be better than 96%. It should be noted that the addition of sodium sulfate was not really necessary if the process is being operated at steady state in a continuous operation mode because it is continuously produced in the system as indicated in the above reaction equations. Sodium bromide not bromine was added in this example because bromine will be generated in the reaction sequence as indicated in Eq. 4.

When tests were performed in the absence of nitrate, the recovery of copper was reduced from 96% to only 18%. On the other hand, when bromide was absent, the recovery of copper was reduced to 74% as all other test conditions were maintained the same. It can be concluded therefore, that it is essential to have both nitrate as well as bromide present in the system for an effective recovery of copper.

It also produced sodium jarosite (natro-jarosite) and elemental sulfur. One big advantage of this process over other technologies available in the literature is the production of jarosite which is easily filterable and environmentally acceptable. This jarosite could easily be converted to hematite ($Fe_2O_3$) by washing with ammonia which usually leads to more recovery of copper and precious metals. This is illustrated in the process flow-diagram shown in FIGS. 1 and 2.

Example No. 2

In order to demonstrate the versatility of the proposed technology and to show its applicability in ores containing nickel as well as copper, a test was conducted with a sulfide ore containing these two metals as well as a host of other metals. The composition of the ore tested in this study was Cu 3.0%, Ni 4.3%, Fe 5.0%, S 9.0%, Pt 626.7 ppm, Pd 1666.7 ppm, Rh 13.3 ppm, Au 45.3 ppm and Ag 10 ppm. The nickel present in this ore sample was believed to be pentlandite (($Fe,Ni)_9S_8$). The leaching test conditions were temperature, 150° C.; leaching time, 20 min.; total pressure, 1380 kPa. (oxygen partial pressure less than 900 kPa.); initial sulfuric acid concentration, 0.67 mole/cm³; initial solid concentration, 12.5%; sodium nitrate concentration, 0.74 mole/cm³; and sodium bromide, 0.12 mole/cm³. The recovery of these metals were found to be: Cu 97.4%, Ni 99.5%, Fe 8.0% and Pd 45.6%. If it is desired, the rest of the metals, especially precious metals, could be recovered to a satisfactory level using the technologies which the authors have developed previously (U.S. Pat. Nos. 5,114,687, 5,308, 381, 5,328,669 and 5,542,957).

Example No. 3

The current technology can also be used to recover metal values from various kinds of scrap. In this example, 25 grams of electronic scrap were paced in a 300 ml. solution containing 60 grams of sodium bromide (NaBr) and 14 ml of bromine ($Br_2$). In this embodiment, the range of bromide/bromine vary as described above. The reaction temperature was 25° C. and the leaching time was 72 hours. Almost all, better than 99.8%, copper was recovered by this leaching process which can be compared very favorably with other technologies for a similar application. It should be noted that if the scrap were subject to size reduction and the temperature were raised to a higher temperature, say 100° C., the total leaching time could have been in the order of one hour. In this example, sodium nitrate was not added because precipitation of iron was not the purpose of this demonstration. A mild acid can be added to enhance the leaching, e.g. sulfuric acid.

In a separate series of tests, potassium nitrate instead of sodium nitrate was used in the treatment of chalcopyrite concentrates. The results were almost identical to what was given in Example No. 1 with a small exception in that the iron precipitation was more favorable with potassium nitrate than sodium nitrate.

FIG. 1 shows an exemplary flowsheet when using chalcopyrite as the material to be treated. Since most of reactants used in the pressure leaching are recycled after filtration, not all of the reactants are depicted. After leaching and filtration, the filtrate containing the dissolved copper and/or nickel can then be subjected to conventional techniques for recovery such as solvent extraction or electrowinning in which copper and nickel are separately recovered as elemental metals. The solid residue from filtration can then be subjected to size classification which could be simply a screen which will separate elemental sulfur and unreacted sulfides which may contain precious metals. The precious metals could then be recovered separately as is known in another process unit operation which is not shown in this diagram. The sodium jarosite (natro-jarosite) can then be subjected to washing with ammonia and conversion to hematite as shown in Fig.2

It should be noted that jarosite is a harmless product which could safely be disposed of after classification, see FIG. 1, and therefore, the steps involved in FIG. 2 are optional. The ammonia washing in FIG. 2 is also an elective process which will recover small amounts, less than 3% of the total copper, of dissolved copper and silver which sometimes are incorporated with jarosite by absorption. After filtration, the remaining solid particles will be sent to the classification step shown in FIG. 1. Excess free ammonia can be recovered by distillation and be recycled. The precipitated ammonium sulfate can be sold as a fertilizer or free ammonia can be recovered from ammonium sulfate in the distillation step by adding lime to precipitate gypsum which could be sold or safely disposed of. Sodium sulfate produced from the distillation unit can be sent back to the leaching tank.

Bromine is advantageous in many respects as compared to iodine in its application as an oxidant. First of all, it is a stronger oxidant as evident by the standard electrical potential and is also more soluble in solution and less expensive than iodine.

Although it is optional, the solid samples are usually reduced in size to increase the metallurgical efficiency of the extraction. Typically, metal or ore samples and other secondary sources such as electronic scrap are ground to less than 60–200 mesh to yield the best dissolution result at a temperature between 100 to 150° C. Other ground sizes can be used depending on the source material or the iodide.

In one mode, the leach solution typically consists of 0.01 to 0.2 mole/$cm^3$ of the bromide/iodide either as sodium bromide or potassium bromide and 0.1 to 1.0 mole/$cm^3$ of the nitrate as sodium or potassium nitrate. Oxygen is also an important part of the process as indicated in the above reaction equations, either added to the reaction zone or in present as part of one or more of the reactants or in form of a separate oxidant, e.g. oxygen gas. Oxygen is believed also to act as a reaction facilitator due to the additional strength of the oxidation state of the system. Although iodide instead of bromide can be used, bromide is preferred because of its low cost, high solubility in water and its better oxidation power. Bromide or iodide under the conditions applied will partially convert to bromine or iodine and therefore, the individual bromine or iodine does not have to be added. When sulfides are subject to leaching, sulfuric acid and elemental sulfur are generated and therefore additional sulfuric acid is not required. Furthermore, the conversion of sulfides to sulfur and/or sulfur to sulfuric acid is a strong exothermic reaction and consequently no additional energy is required to maintain the desirable temperature for the leaching reactions.

As such, an invention has been disclosed in terms of preferred embodiments thereof which fulfill each and every one of the objects of the present invention as set forth herein above and provides a new and improved method of recovering copper and/or nickel from various materials.

Various changes, modifications and alterations from the teaching of the present invention can be contemplated by those skilled in the without departing from the intended spirit and scope thereof. Accordingly, it is intended that the present invention only be limited by the terms of the appended claims.

What is claimed is:

1. A process for the extraction of at least one metal selected from the group consisting of copper and nickel from a material by a leaching process comprising the steps of:

a) charging to a reaction zone at least one of copper and a nickel bearing material, water, at least one of bromide and iodide, at least one of sodium and potassium nitrate, in effective amount for leaching of said metal to form a charged reaction zone;

b) mixing the charged reaction zone to leach copper or nickel from said materials thereby producing a slurry containing said metal in solution;

c) separating the metal in solution from the slurry; and d) recovering the metal in solution; and further wherein one of bromine and iodine is generated during said mixing step for said leaching of said metal.

2. The process of claim 1 wherein the material is leached in a 0.1–1.0 gram-mole/$dm^3$ concentration of sodium or potassium nitrate.

3. The process of claim 2 wherein the material is leached in a 0.01–0.2 gram-mole/$dm^3$ concentration of sodium or potassium bromide.

4. The process of claim 1 wherein the slurry is maintained at a temperature between 25° C. and 150° C.

5. The process of claim 4 wherein the temperature ranges between 100° C. and 150° C.

6. The process of claim 1 wherein the pH of the solution ranges between 0.5 and 5.0.

7. The process of claim 6 wherein the pH ranges between 1 and 2.

8. The process of claim 1 wherein oxygen is supplied to the reaction zone.

9. The process of 8 wherein the initial partial pressure of oxygen ranges from 30 psi (207 kPa) to up to 200 psi (1380 kPa).

10. The process of claim 1 wherein sulfuric acid is charged to the reaction zone in effective amounts for said leaching.

11. The process of claim 1 wherein the material is chalopyrite.

12. The process of claim 1 wherein the metal in solution is recovered by one of electrowinning, concentration, solvent extraction and chemical precipitation.

13. A method of recovery of copper from electronic scrap comprising the steps of:

a) providing an electronic scrap;
b) providing at least one reactant selected from the group consisting of bromide, bromine, iodide, iodine and combinations thereof;
c) mixing the reactants and the electronic scrap to form a leach solution, the reactant being present is selected in an amount effective to leach the copper from the electronic scrap; and
d) recovering the copper from the leach solution.

14. The process of claim 13 wherein the reactant includes bromine and bromide ranging between, in total concentration, 0.01 gram mole/$dm^3$ and 0.20 gram mole/$dm^3$.

15. The process of claim 13 wherein the metal in solution is recovered by one of electrowinning, concentration, solvent extraction and chemical precipitation.

* * * * *